May 15, 1962    T. C. SCHUBACH    3,034,824
KNOCK-DOWN TRUCK AND TRAILER BODY CONSTRUCTION
Filed Dec. 6, 1960
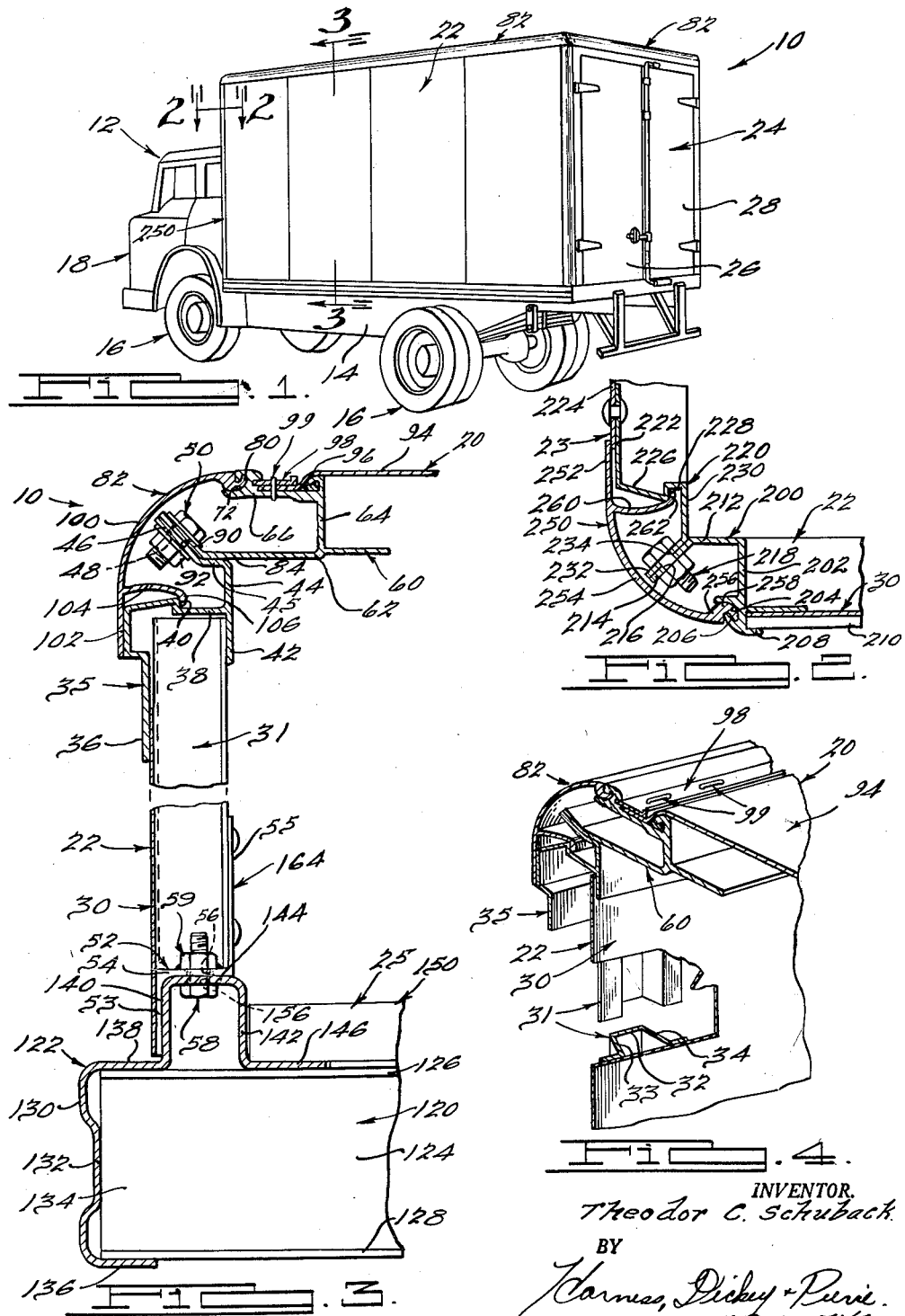
INVENTOR.
Theodor C. Schubach
BY
Harness, Dickey & Pierce
ATTORNEYS

United States Patent Office 3,034,824
Patented May 15, 1962

3,034,824
KNOCK-DOWN TRUCK AND TRAILER
BODY CONSTRUCTION
Theodor C. Schubach, Detroit, Mich., assignor to Fruehauf Trailer Company, Detroit, Mich., a corporation of Michigan
Filed Dec. 6, 1960, Ser. No. 74,090
2 Claims. (Cl. 296—28)

This invention relates generally to vehicle constructions and more particularly to a knock-down truck and trailer body construction.

There is a present need for a truck and trailer body comprising front, rear, side wall, roof and floor sections that can be prefabricated at the factory, complete with insulation if required, and either assembled into a complete body at the factory or sold knocked-down in kit form. In order to facilitate the latter method of merchandising, such sections are preferably constructed so that they are substantially flat, permitting the sections to be stacked compactly for shipment.

Another desirable feature of such a knock-down vehicle body construction is that the panels thereof can be assembled and bolted or otherwise secured together entirely from the outside of the body. Also, the bolts are preferably completely covered after assembly so as to be protected against rust and corrosion and to improve the finished appearance of the vehicle body.

The present invention presents a solution to these problems, as well as to many of the other problems inherent in a knock-down body construction, by providing the generally rectangular panels of the body with novel edge rails having complementary angularly orientated nesting edge flanges that facilitate assembly of the panels with the retaining bolts therefor entirely from the exterior of the body. The body construction also includes a novel snap-on cover rail that covers and protects the retaining bolts.

Accordingly, one object of the present invention is an improved construction for a truck or trailer body.

Another object is a knock-down body construction comprising sections or panels that are substantially flat to facilitate stacking.

Another object is a vehicle body construction wherein the means employed to retain adjacent panels together is completely covered upon assembly.

Another object is a knock-down vehicle body that can be assembled entirely from the outside of the body.

Another object of the present invention is a vehicle body construction wherein the joint between adjacent panels is covered by a snap-on cap strip.

Other objects and advantages of the present invention will become apparent from the following description, claims and drawing wherein:

FIGURE 1 is a perspective view of a truck having a body construction in accordance with an exemplary embodiment of the present invention;

FIG. 2 is a fragmentary cross sectional view taken substantially along the line 2—2 of FIGURE 1;

FIG. 3 is a fragmentary cross sectional view taken substantially along the line 3—3 of FIGURE 1; and FIG. 4 is a fragmentary perspective view of a portion of the structure of FIG. 3.

Referring now to the drawings, a knock-down truck or trailer body 10 is shown mounted on a truck 12. The truck 12 is of conventional construction and comprises, for example, a pair of longitudinal frame members 14 that underlies the body 10 for the support of a conventional suspension system 16 and a cab 18. It is to be understood that the particular construction of the truck 12 forms no part of the present invention, the knock-down body 10 being mountable on any type of vehicle having frame members similar to the frame members 14 of the truck 12.

The truck or trailer body 10, in accordance with an exemplary embodiment of the present invention, comprises a top or roof panel 20, a pair of side panels 22, a front panel 23, a rear panel 24 and a bottom or floor panel 25, each of which is of generally rectangular configuration. It is to be understood that either of the side panels 22 or the rear panel 24 may be provided with doors, for example doors 26 and 28 (FIG. 1) or other openings if desired.

Referring to FIG. 3, the vertically orientated side panels 22 comprise an outer skin 30 that is supported by, for example, a plurality of spaced and vertically aligned posts 31. In an exemplary constructed embodiment the posts 31 are of generally U-shaped cross sectional configuration defined by a bight portion 32 and leg portions 33 and 34 thereby to impart stiffness to the vertical side panels 22.

The side panels 22 are provided with a longitudinally extending top side rail 35 having a downwardly extending flange portion 36, a transverse section 38 with a vertical shoulder 40 thereon, a vertically downwardly extending section 42 that overlies an inner surface of the post 31, an upwardly extending section 44 having a horizontal shoulder 45 thereon, and an angularly upwardly and outwardly extending edge flange 46. The edge flange 46 has a plurality of spaced and aligned apertures 48 therein for the acceptance of a plurality of retaining bolts 50. The top rail 35 is secured to the skin 30 and posts 31 by any suitable means, for example rivets (not shown).

The panels 22 have a lower side rail 52 of generally Z-shaped configuration defined by a downwardly extending flange 53, a transverse flange 54 and an upwardly extending flange 55. The intermediate transverse flange 54 has a plurality of aligned apertures 56 therein for the acceptance of a plurality of retaining bolts 58. Preferably, a plurality of nuts 59 are welded to the flange 54 in alignment with the apertures 56 so that the bolts 58 can be threaded thereinto to facilitate assembly as will be described.

As best seen in FIGS. 3 and 4, the side panel 22 is adapted to be joined to the roof panel 20 by engagement of the top rail 35 with a roof rail 60 on the roof panel 20. The roof rail 60 comprises a horizontally extending lower flange 62, a vertically extending rib 64 and an upper horizontal flange 66 having an arcuate seat 72 therein for the acceptance of a complementary arcuate gooseneck 80 of a snap-on cover rail 82.

The lower flange 62 of the roof rail 60 has a horizontal section 84 outboard of the vertical rib 64 thereof that terminates in an angularly upwardly and outwardly extending edge flange 90 complementary to the edge flange 46 on the top rail 35 of the side panel 22 so as to be engageable therewith in nesting relationship. The edge flange 90 has a plurality of apertures 92 therein aligned with the apertures 48 in the top rail 35 for the acceptance of the bolts 50, thereby to secure the side panel 22 and roof panel 20 in substantially normal relationship.

A roof skin 94 is stretched across an arcuate section 96 on the vertical rib portion 64 of the roof rail 60 and is secured thereto by a retainer strip 98 that is fastened down as by a plurality of staples 99. A sealing compound is injected under the skin 94 between the arcuate section 96 on the rib 64 and the flange 66, as is more particularly described in application, Serial No. 101,459, filed April 7, 1961 for Sealing Construction for Trucks, Trailers and the Like and assigned to the assignee of the present invention.

The snap-on cover rail 82 has a generally arcuate mid-section 100 terminating in a downwardly depending flange 102. A rib 104 extends generally normally to and inwardly of the flange 102 and has a downwardly extending terminal finger 106 thereon for locking engagement with the vertical shoulder 40 on the top side rail 35.

After alignment of the side panel 22 and roof panel 20 and the tightening of the bolts 50 which hold the panels 20 and 22 in generally normal relationship, the gooseneck portion 80 of the cap rail 82 is engaged in the arcuate seat 72 of the roof rail 60. The cap rail 82 is then rotated downwardly about the arcuate seat 72 until the finger 106 on the rib 104 snaps behind the shoulder 40 on the top side rail 35. It is to be noted that the slope of the transverse portion 38 of the top side rail 35 functions as a cam to guide the finger 106 of the rib 104 into locking engagement behind the shoulder 40.

As best seen in FIG. 3, the floor panel 25 comprises a plurality of transverse members 120 and a floor side rail 122, the side rail 122 completely surrounding the floor panel 25. The transverse members 120 may be of any suitable cross section, for example, I-beams comprising a web portion 124 and flange portions 126 and 128.

The floor side rail 122 has a vertical section 130 and a recessed center portion 132 that engages an outboard end 134 of each transverse beam 120. The vertical section 130 of the rail 122 terminates in an inwardly folded lower edge flange 136 that underlies the lower flange 128 of the transverse beam 120. A horizontal section 138 of the side rail 122 overlies the upper flange 126 of the beam 120, the beam 120 being positively located with respect to the rail 122 by the engagement of the horizontally extending portions 136 and 138 therewith. The horizontal portion 138 of the rail 122 has an upwardly extending U-shaped fold, defined by upstanding leg portions 140 and 142 having a bight portion 144 therebetween. The leg portion 142 terminates in a horizontally extending edge flange 146 that is engageable with and overlies the upper flange 126 on the beam 120. A floor member 150 for example, conventional wood planking, plywood, or other suitable flooring material, overlies the beams 120 and extends between opposite ones of the leg portions 142 on the rail member 122. It is to be noted that the thickness of the floor 150 is substantially equal to the height of the leg portions 140 and 142 so that the floor panel 25 is substantially devoid of lateral projections.

The bight portion 144 of the vertically extending fold in the rail 122 has a plurality of spaced and aligned apertures 156 therein for the acceptance of the bolts 58. The bolts 58 cooperate with the nuts 59 that are welded to the upper surface of the intermediate flange portion 54 of the bottom side rail 52 of the panel 22, to facilitate assembly of the side panel 22 and the bottom panel 25. A socket wrench can be engaged with the heads of the bolts 58 from the bottom side of the floor 25 between the beams 120 and the bolts 58 advanced into the nuts 59 thereby to draw the side panel 22 downwardly against the floor panel 25.

Referring now to FIG. 2, the side panels 22 and front and rear panels 23 and 24 are similar in construction except for the vertical terminal edges thereof. A typical junction of a side panel 22 with a front panel 23 or rear panel 24 is shown in FIG. 2. The side panel 22 has a vertically extending edge rail 200 comprising a transversely outwardly extending section 202 having an arcuate seat 204 therein and a reentrantly folded portion 206 overlying the arcuate section 204. A terminal edge portion 208 extends in the opposite direction from the reentrantly folded portion 206 to overlie the outer skin 30 and a spacer member 210. The vertical edge rail 200 has an inner portion 212 extending generally parallel to the plane defined by the inner edges of the vertical posts 31. The flange 212 terminates in an angularly related edge portion 214 that makes substantially a 45° angle with the plane of the side panel 22. The edge flange 214 has a plurality of vertically spaced apertures 216 therein for the acceptance of a plurality of retainer bolts 218.

The front panel 23 has a vertical edge rail 220 comprising an outer flange 222 that underlies a frontal skin 224. The rail 220 has a rearwardly extending portion 226 with a generally normally extending shoulder portion 228 thereon intermediate the portion 222 and an inner flange portion 230. The flange portion 230 terminates in an angularly related edge flange 232 that extends at an angle of substantially 45 degrees to the plane of the front panel 23 and therefore is complementary to the edge flange 214 on the side panel 22. The edge flange 232 has a plurality of apertures 234 therein for acceptance of the bolts 218 whereby the front and side panels 23 and 22, respectively, are rigidly secured to one another.

The junction of the front and side panels 23 and 22, respectively, is enclosed by a vertically extending corner rail similar to the cap rail 82. The vertical edge rail 250 comprises an edge portion 252 that overlies the frontal skin 224 of the front panel 23 and an arcuate section 254 that extends between the front and side panels 23 and 22 and terminates in a gooseneck 256 complementary to the reentrantly folded portion 206 on the vertical rail 200 and having an arcuate section 258 acceptable in the arcuate seat 204 in the vertical rail 200. The edge rail 250 has a generally normally extending rib portion 260 with a finger 262 thereon engageable behind the shoulder 228 on the vertically extending edge rail 220. In this manner the edge cover 250 is snapped into position to completely enclose the retaining bolts 218 and associated structure.

From the foregoing description, it should be apparent that the roof panel 20, side panels 22, front panel 23, rear panel 24 and floor panel 25 are relatively free of lateral projections and therefore are readily stackable for shipment.

Assembly of the trailer body 10 may be accomplished by securing the floor panel 25 to the longitudinal frame members 14 of the truck 12 by any suitable means (not shown). The side panels 22, front panel 23 and rear panel 24 are then secured to the floor panel 25 by threading the bolts 58 upwardly through the complementary nuts 59 in the respective panels, access to the bolts 58 being provided from the underside of the floor panel 25 between the beams 120 thereof. After the side panels 22, front panel 23 and rear panel 24 are drawn downwardly on their complementary seats on the floor panel 25, the bolts 218 are inserted through the aligned apertures in the complementary vertical rails 200 and 220 which, upon tightening, rigidly tie the side panels 22, front panel 23, and rear panel 24 together. After the bolts 218 are tightened, the goosenecks 258 of the vertically extending corner rails 250 are engaged in their complementary arcuate seats 204 in the rails 200 of the side panels 22 and rotated thereabout until the finger portions 262 of the rails 250 snap behind the shoulders 262 on the complementary rails 220, respectively, thereby completely enclosing and protecting the terminal edge rails 200 and 250 and retaining bolts 218 therefor. The roof panel 20 is superposed on top of the side panels 22, front panel 23 and rear panel 24, the complementary terminal edges thereof being engaged in the aforementioned nesting relationship. The bolts 50 are then inserted through the complementary apertures in the nesting terminal edge portions and drawn together.

The goosenecks 80 of the cover rails 82 are then engaged in their complementary arcuate seats 72 in the edge rails 60 of the roof 20 and rotated downwardly until the finger portions 106 snap behind the complementary shoulders 40 on the top edge rails 35 of each side panel 22, front panel 23 and rear panel 24, respectively.

It is to be understood that the specific construction of the improved knock-down truck and trailer body construction herein disclosed and described is presented for the purpose of explanation and illustration and is not intended to indicate limits of the invention, the scope of which is defined by the following claims.

What is claimed is:

1. A knock-down truck and trailer body construction comprising a plurality of generally planar normally orientated panels having rails along the edges thereof, the rails on said panels having edge portions, respectively, extending at substantially 45 degrees to the plane of their respective panels so as to be engageable in nesting relationship when adjacent ones of said panels are orientated in said generally normal relationship, one of said rails engaged in said nesting relationship having a shoulder means and the other of the rails having an arcuate seating means, means for securing nesting ones of said rails together, and a cover having an arcuate section pivotally engageable with the arcuate seat of said other rail and a locking finger resiliently engageable with the shoulder on said one rail to conceal said securing means.

2. A knock-down truck and trailer body construction in accordance with claim 1 wherein said securing means is engageable with said edge portions entirely from the exterior of the body construction.

References Cited in the file of this patent
UNITED STATES PATENTS

| Number | Name | Date |
|---|---|---|
| 1,751,737 | Hoskyns | Mar. 25, 1930 |
| 1,796,024 | Hohler | Mar. 10, 1931 |
| 2,377,702 | Lindsay | June 5, 1945 |
| 2,591,654 | Dean | Apr. 1, 1952 |
| 2,600,140 | Torseth | June 10, 1952 |